United States Patent Office.

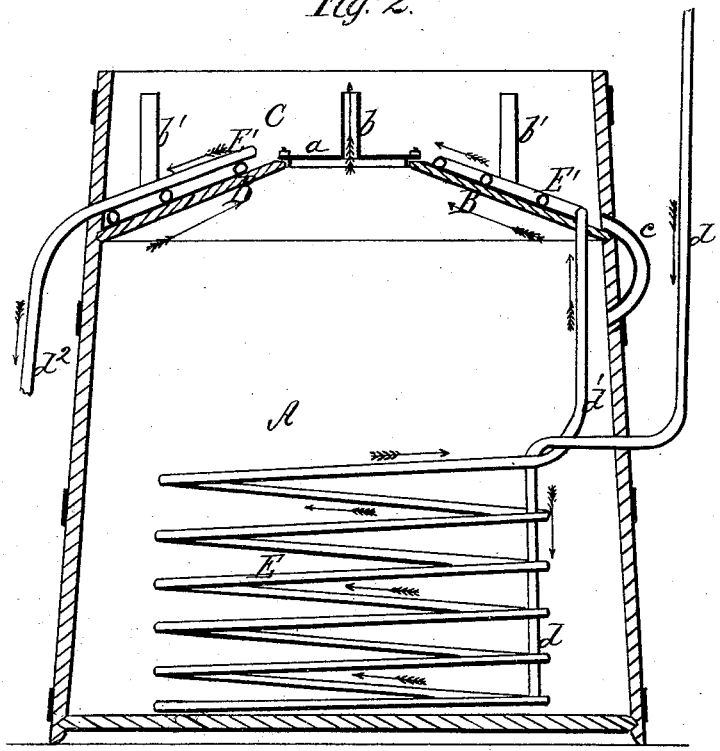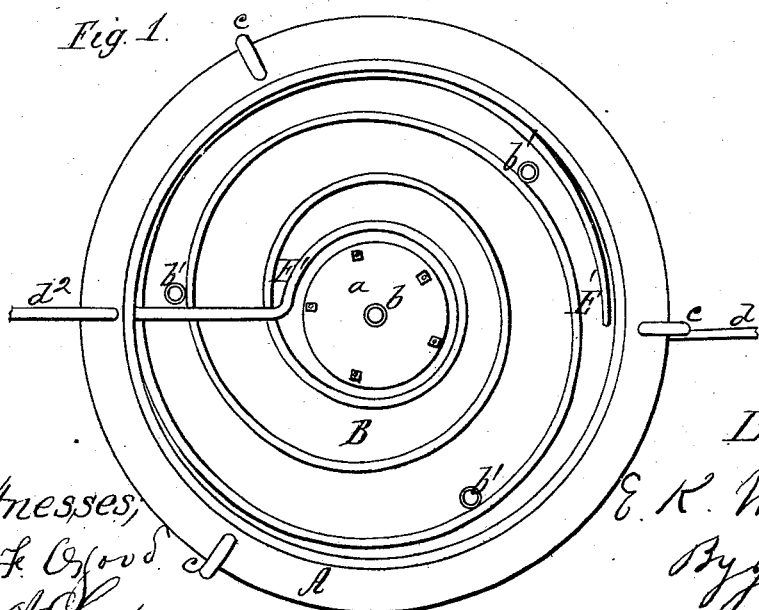

E. K. WARREN, OF ROCHESTER, NEW YORK.

Letters Patent No. 82,905, dated October 6, 1868.

IMPROVEMENT IN TANKS FOR FERMENTING ALE, BEER, &c.

The Schedule referred to in these Letters Patent and making part of the same.

TO ALL WHOM IT MAY CONCERN:

Be it known that I, E. K. WARREN, of the city of Rochester, county of Monroe, and State of New York, have invented a certain new and useful Improvement in Tanks or Pontoons for Fermenting Ale, Beer, and other Liquors; and I do hereby declare that the following is a full and exact description thereof, reference being had to the accompanying drawings, making part of this specification, in which—

Figure 1 is a plan, and
Figure 2 a central vertical section.

Like letters of reference indicate corresponding parts in both figures.

In the old method of fermentation, the yeast is allowed to work out of the bung-hole, which not only involves a very imperfect action, but occasions much loss of the liquid.

To remedy this difficulty, an apparatus has been patented (April 23, 1867, No. 63,994), in which the yeast works up from the cask (or a series of them) through a long tube, and into a trough above, where the liquid is condensed by contact with an underlying water-chamber, and is thence conveyed back into the cask again, thereby performing a circuit. The water from the water-chamber is also made to pass through the body of the cask to keep it cool.

Although this plan is a vast improvement upon the old method, yet it is attended with serious difficulties and objections: The acute form of the top of the cask causes the yeast to adhere and remain without passing off freely, and the small escape-tube, of considerable length, retards the rising and escape of the same, and the consequence is, that a portion of the yeast remains in the liquor and impairs its value. In addition to this, but a small circuit of the water is produced through the body of the cask, and this only after it has spent the most of its coldness upon the material in the yeast-trough above, whereas the reverse should be the case, passing first through the cask.

To remedy these difficulties, my invention consists in the employment, in a single tank or pontoon holding the body of the liquid, of a conical or inclined top, which concentrates the yeast upward in a mass, and discharges it into a chamber above, whence the condensed liquid is carried back into the pontoon again by suitable pipes.

The invention further consists in combining with the above a double coil of water-pipe, so arranged that the water first enters the body of the pontoon to cool the mass under fermentation, and then passes over the upper surface of the conical top, to condense the liquid carried up with the yeast.

In the drawings, A indicates the pontoon or tank, which is preferably made of wooden staves, banded with iron, and of sufficient size to hold the largest brewing in mass.

In the upper portion of the pontoon is situated a conical or inclined top, B, leaving above it an open chamber, C, of sufficient capacity to receive the yeast that works up by the fermentation.

At the apex of the cone is a cover, a, of sufficient size to allow a person to enter to clean the tank when it is removed. From the centre of this cover rises a tube, b, and from other points of the conical top rise similar tubes, b' b', for the purpose of allowing a free action of the yeast in working upward.

From the base or deepest portion of chamber C return-tubes, c c, lead back into the pontoon, thereby conveying back the condensed liquid that separates from the yeast.

The special feature of novelty I claim in this part of the invention is the conical or inclined top, B, which serves to concentrate the yeast to the centre, where it escapes freely.

It will be noticed that the greatest facility is given for the working off of the yeast, since there are no square or acute angular sides to obstruct it, but, instead, a gradual and obtuse incline, as shown by the red arrows; therefore the yeast will not cling or adhere to the sides, but will pass up easily and readily to the extreme top, at which point the passage through tubes b b' is very short, and is accomplished without difficulty.

This arrangement is, manifestly, a great improvement upon that at first described, where the yeast is obstructed by the sides of the cask, and where it has to pass upward through an extended tube.

In addition to the above, the conical form of the top, B, is such as to afford the greatest facility to the condensation in the chamber C, by means of the water-pipe spread over the floor thereof, as will presently be described.

The induction water-pipe, $d$, passes inward and downward to the bottom of the pontoon, where it gradually circles upward, forming a coil, E, in the body of the pontoon, and thence the length, $d^1$, passes still upward through the conical top, B, and then circles over the floor of same, forming a second coil, E', and finally escapes through the side of the pontoon, forming the eduction-pipe, $d^2$.

By this special arrangement of the pipe I am enabled first to expend the primary coldness of the water in cooling the great mass of the liquid in the pontoon, and then use the balance in condensing the liquid thrown up by the yeast in chamber C. In the case first cited, the reverse is the result, the primary coldness of the water being expended upon the yeast, and then passing into the cask to cool the body of liquid.

In my method, I am enabled to obtain the proper equilibrium, thereby producing a more even and uniform fermentation, and consequently a better product of ale or beer.

This method of fermenting ale or beer, in a close tank or pontoon of sufficient capacity to hold a brewing in bulk, is far superior to that where a series of casks or puncheons is employed, since the liquid is then all fermented alike.

What I claim as my invention, and desire to secure by Letters Patent, is—

1. The employment of the conical or inclined top C, in combination with pontoon A, for concentrating the yeast and facilitating its escape, as herein described.

2. The combination and arrangement, with the pontoon A and conical top B, of the two coils, E E', of water-pipe, the water passing first into E, and then upward into E', the whole as described and for the purpose specified.

In witness whereof, I have hereunto signed my name, in the presence of two subscribing witnesses.

E. K. WARREN.

Witnesses:
R. F. OSGOOD,
W. A. LODER.